United States Patent [19]

Masuzawa et al.

[11] 3,852,650

[45] Dec. 3, 1974

[54] SERVO APPARATUS FOR MARINE AUTOPILOT

[75] Inventors: Isao Masuzawa, Kuki; Tsuneo Awano; Kazutoshi Onishi, both of Yokohama, all of Japan

[73] Assignee: Kabushikikaisha Tokyo Keiki (Tokyo Keiki Co., Ltd.), Tokyo, Japan

[22] Filed: May 23, 1973

[21] Appl. No.: 363,167

[30] Foreign Application Priority Data

May 27, 1972 Japan .............................. 47-52736

[52] U.S. Cl. ................................ 318/588, 318/615

[51] Int. Cl. ........................ G05d 1/00, B63h 25/02

[58] Field of Search ........... 318/615, 616, 617, 588

[56] References Cited

UNITED STATES PATENTS

| | | | |
|---|---|---|---|
| 2,887,642 | 5/1959 | Ehret et al. | 318/616 |
| 3,351,829 | 11/1967 | Qvarnstrom | 318/615 X |
| 3,656,043 | 4/1972 | Kawada et al. | 318/588 |
| 3,696,282 | 10/1972 | Hirokawa | 318/588 |
| 3,721,883 | 3/1973 | Whitmore et al. | 318/615 |

*Primary Examiner*—B. Dobeck
*Attorney, Agent, or Firm*—Hill, Gross, Simpson, Van Santen, Steadman, Chiara & Simpson

[57] ABSTRACT

A servo apparatus for a marine autopilot having a servo loop consisting of a servo-amplifier, a relay-like operation device, a power unit, a transducer and a feedback circuit. The feedback circuit includes a first series circuit consisting of a resistor and a variable resistor and a second series circuit consisting of a resistor and a capacitor for stabilization so that stabilization effect on the servo loop by the second series circuit is varied by changing the resistance value of the variable resistor.

4 Claims, 4 Drawing Figures

SERVO APPARATUS FOR MARINE AUTOPILOT

BACKGROUND OF THE INVENTION

1. Field of the Invention

This invention relates to a servo apparatus for a marine autopilot, and more particularly to a servo apparatus for a marine autopilot in which the constant of a servo loop stabilizing circuit, that is, a hunting preventive circuit, is automatically changed in association with the so-called rudder angle ratio adjusting mechanism for adjusting the proportional constant of the servo apparatus, thereby to ensure stability of the servo system in all set values of the adjusting mechanism having a rudder angle over a wide range.

2. Description of the Prior Art

Generally, a servo apparatus for a marine autopilot is the so-called contactor servo apparatus which includes in its servo loop a forward relay-like operation device, such as a relay, a relay amplifier formed with a transistor, a semiconductor element performing a relay-like operation, a hydraulic or pneumatic solenoid valve, a clapper switch or a compound device. Such a contactor servo apparatus has the following two features. It is possible to control any type of servo motor such as electric (DC or AC), hydraulic and pneumatic ones as a power unit by means of the relay-like operation device and to obtain an inexpensive, reliable and relatively long-lasting apparatus by employing a stout, relay-like operation device as means for controlling the power unit. By virtue of these features, the contactor servo apparatus is employed in the marine autopilot.

In the prior art, if the proportional constant of a servo apparatus is varied over a wide range with the feedback path of a servo loop, the stability of the servo loop is deteriorated or hunting occurs in the servo loop.

SUMMARY OF THE INVENTION

Accordingly, the primary object of this invention is to provide a servo apparatus for use in a marine autopilot which is free from the aforementioned defects encountered in the prior art and which is adapted for automatically interlocking a rudder angle adjustment mechanism and a hunting preventive circuit by simple circuit construction without specially providing an interlocking mechanism for them.

Other objects, features and advantages of this invention will become more apparent from the following description taken in conjunction with the accompanying drawings.

DESCRIPTION OF THE PREFERRED EMBODIMENTS

Figure 1:
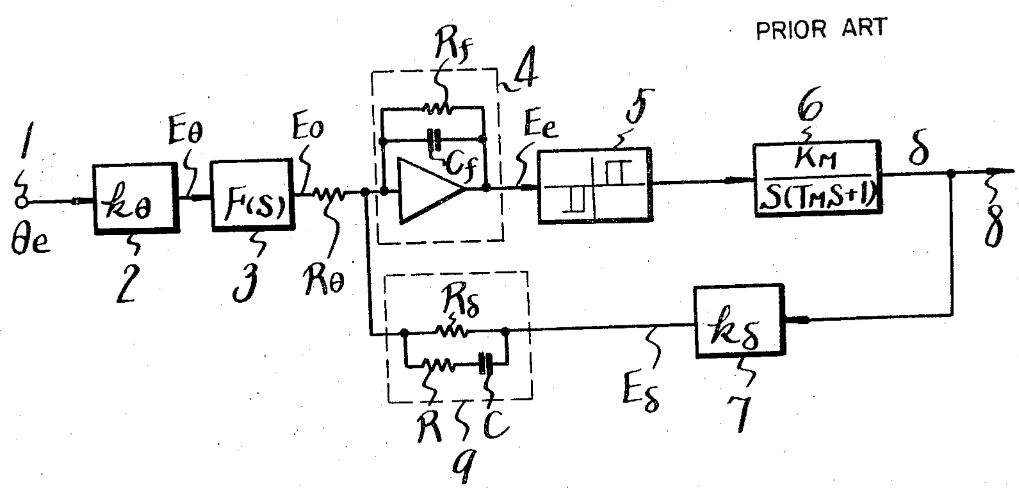
FIG. 1 is a schematic diagram showing the circuit and construction of a conventional servo apparatus for use in a marine autopilot.

Prior to a detailed description of the invention, one example of a conventional servo apparatus for use in an autopilot will be described in connection with FIG. 1. An input deviation $\theta_e$ to an input terminal 1 is the difference $(\theta_i - \theta)$ between a set course $\theta_i$ and the ship's heading $\theta$. This deviation angle $\theta_e$ is converted by a transducer 2 into an electrical signal $E_\theta$. The transducer 2 is a potentiometer or a combination of a synchro with a demodulator or an electromagnetic pick-up circuit. The signal $E_\theta$ is rendered by a rudder order computer circuit 3 into an electrical signal $E_O$, which is applied as an input signal to a servo amplifier 4 through a resistor $R_\theta$. A rudder order δ is obtained at an output end 8 and converted by a transducer 7 into an electrical signal $E_\delta$. The transducer 7 is a potentiometer or a combination of a synchro with a demodulator. The signal $E_\delta$ is applied to the servo amplifier 4 through a feedback circuit 9. The servo amplifier the 4 amplifies two inputs to provide and output voltage $E_e$, which is fed to such relay-like operation device 5 as described previously to cause it to actuate a power unit 6. $K_M/S(T_M S + 1)$, shown in the block of the power unit 6 is its transfer function, $S$ being the Laplace operator. The output from the power unit 6 is the rudder order δ which is a mechanical position displacement. In the case of an autopilot for large ships, the rudder order δ is applied as an input to a stering engine and the actual rudder angle is taken from the output from the steering engine, while, in the case of an autopilot for small ships, the rudder is directly moved by the output from the power unit 6 and the rudder order δ shows the actual rudder angle. The feedback circuit 9 in the feedback path of the servo apparatus comprises a feedback resistor $R_\delta$ and a series circuit of a resistor $R$ and a capacitor $C$ connected in parallel therewith. The series circuit of the resistor $R$ and the capacitor $C$ is the so-called hunting preventive circuit which produces a lead signal of the feedback signal $E_\delta$, thereby to stabilize the servo loop. Accordingly, the hunting preventive circuit has no relation to the input-output characteristic of the apparatus depicted in FIG. 1. Provided that the sensitivity of the servo apparatus of FIG. 1 is a sufficiently high in practice, its input-output characteristic is given by the following equation (1):

$$-\delta(S)/\theta_e(S) = k_\theta / k_\delta \cdot R_\theta / R_\delta \; F(S) \quad (1)$$

where $k_\theta$ and $k_\delta$ are constants of the transducers 2 and 7, respectively, and F(S) is the characteristic of the rudder order computer circuit 3. One example of this characteristic, for example, in the case of a "proportional plus derivative plus integral" control, is as follows:

$$F(S) = k\,(1 + T_D S/T_F S + 1)\,(1 + 1/T_I S) \quad (2.)$$

where $k$ is a proportional constant, $T_D$ the derivative time, $T_F$ a filter time constant and $T_I$ the integral time.

Accordingly, the input-output characteristic of the apparatus of FIG. 1 is expressed by the following equation (3):

$$-\delta(S)/\theta_e(S) = k\,k_\theta / k_\delta \cdot R_\delta / R_\theta \;(1 + T_D S/T_F S + 1)(1 + 1/T_I S) \quad (3.)$$

In the cases of "proportional" control, "proportional plus derivative" control or in the case of "proportional plus integral" control, the characteristics correspond to those obtained by substituting $[T_D = 1/T_I = 0]$, $[1/T_I = 0]$ and $[T_D = 0]$ in the equation (3) respectively. The proportional constant in the equation (3) is a rudder angle ratio $K_P$ given by the following equation (4).

$$K_P = (k k_\theta / R_\theta) \cdot (R_\delta / k_\delta) \quad 4.$$

It represents the value of the proportional rudder angle per unit deviation angle. Adjustment of the rudder angle ratio $K_P$ can be achieved by changing any of $k$, $k_\theta$, $k_\delta$, $R_\delta$ and $R_\theta$ as shown in the equation (4). However, with systems of the type that the rudder angle is adjusted by changing $k$, $k_\theta$ and $R_\theta$, if the sensitivity $\beta$ of the relay-like operation device 5 is 1°, for example, in terms of the input deviation $\theta_e$ when the rudder angle ratio $K_P = 1$, the sensitivity $\beta$ of the relay-like operation device 5 is 3° in terms of the deviation $\theta_e$ when the rudder angle ratio $K_P = 1/3$, so that accuracy of the servo apparatus becomes extremely poor. While, in the case of the rudder angle ratio $K_P = 3$, the sensitivity $\beta$ of the relay-like operation device 5 is 1°/3 in terms of the deviation $\theta_e$ and becomes unnecessarily high in which case the number of operations of the relay-like operation device 5 increases, resulting in shortening the service life of the device 5 and the power unit 6. Accordingly, it may be understood that the rudder angle adjusting systems using $k$, $k_\theta$ and $R_\theta$ are impractical. On the other hand, rudder angle adjusting systems employing $k_\delta$ and $R_\delta$ are free from such defects as described above, and hence are in practical use.

A description will be given of the effect of the hunting preventive circuit consisting of the resistor $R$ and the capacitor $C$ in the feedback circuit 9 of the servo apparatus depicted in FIG. 1. If a feedback current is taken as $I_\delta$, it is expressed by the following equation (5):

$$I_\delta (S) = k_\delta / R_\delta \ (1 + R_\delta \ CS/RCS + 1)\delta \quad 5.$$

As shown by the numerator of the second term of the equation (5), the capacitor $C$ serves to provide a derivative signal of the rudder angle $\delta$ and the derivative time therefor is $R_\delta C$, by which the servo loop is stabilized. As shown by the denominator of the second term of the equation (5), the resistor $R$ serves as a filter for the derivative signal produced by the capacitor $C$. Using the equation (4), the equation (5) is expressed by the following equation (6):

$$I_\delta (S) = (k k_\theta / R_\theta) \ 1/K_P \ (1 + R_\delta \ CS/RCS + 1)\delta \quad 6.$$

In the system where the rudder angle ratio $K_P$ is adjusted with $k_\delta$ or $R_\delta$, the gain of the feedback current $I_\delta (S)$ is inversely proportional to the rudder angle ratio $K_P$ as shown in the equation (6). Consequently, a decrease in the rudder angle ratio $K_P$ causes an increase in the gain constant of the servo loop of the servo apparatus which lowers the stability of the servo loop. If the hunting preventive circuit is selected so that even when the rudder angle ratio $K_P$ is small, the servo loop is held stable, when the rudder angle ratio $K_P$ is large, stability of the servo loop increases more than necessary and the operation of the power unit 6 is stopped and started many times before the rudder angle $\delta$ reaches a desired value. The relay-like operation device 5 repeatedly turns on and off many times, which shortens the lifetime of the device 5 and the power unit 6. If the range of adjustment of the rudder angle ratio $K_P$ is selected so narrow as not to introduce such defects, no problem is presented but, in order to make the rudder angle ratio adjustable over a wide range, it is necessary to employ a hunting preventive circuit which overcomes these defects.

In the system of adjusting the rudder angle ratio $K_P$ with $k_\delta$, the adjustment has no relation to the derivative time $R_\delta C$ and the filter time constant $RC$ of the hunting preventive circuit as expressed in the equation (6). Therefore, this system exhibits only a certain degree of hunting preventive effect regardless of changes in the gain constant of the servo loop when the rudder angle ratio $K_P$ is altered by changing $k_\delta$, so that such defects as mentioned above occur which make it impossible to realize rudder angle adjustment over a wide range.

In the system of adjusting the rudder angle ratio $K_P$ with $R_\delta$, the adjustment has an influence upon the derivative time $R_\delta C$ by the hunting preventive circuit, as expressed in the equation (6). When the rudder angle ratio $K_P$ is decreased by decreasing $R_\delta$, the derivative time $R_\delta C$ becomes short to lessen the stabilizing effect but increases the gain constant of the servo loop, so that stability is lowered by both factors. Accordingly, this system is inferior to one which changes $k_\delta$.

In the example of FIG. 1, a resistor $R_f$ in the amplifier 4 is a feedback resistor of the amplifier and a capacitor $C_f$ is a noise filtering capacitor.

Figure 2:
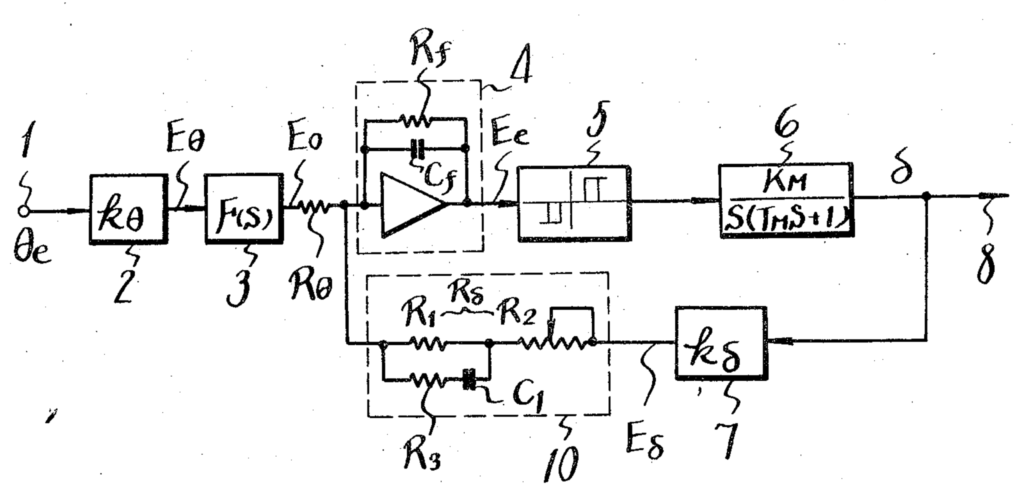
FIG. 2 is a schematic diagram illustrating the circuit and construction of one example of a servo apparatus for use in marine autopilot according to this invention.

This invention will hereinafter be described with reference to FIG. 2 illustrating one example of the servo apparatus for a marine autopilot according to this invention. In the figure, parts corresponding to those in FIG. 1 are identified by the same reference numerals and their description will not be given for the sake of brevity.

The example of this invention depicted in FIG. 2 employs in its servo loop a feedback circuit 10 which is different in construction from circuit 9 used in the example of FIG. 1. The feedback circuit 10 comprises a resistor $R_1$, a series circuit of a resistor $R_3$ and a capacitor $C_1$ connected in parallel with the resistor $R_1$ and a variable resistor $R_2$ connected in series therewith. The variable resistor $R_2$ is provided for rudder angle ratio adjustment. If the resistance values of the resistors $R_1$ and $R_3$ are taken as $R_1$ and $R_3$ respectively; the capacitance of the capacitor $C_1$ is taken as $C_1$; and a selected value of the variable resistor $R_2$ is taken as $R_2$, the feedback current $I_\delta$ is expressed by the following equation (7):

$$I_\delta (S) = k_\delta / R_1 + R_2 \cdot (R_1 + R_3)C_1S + 1/(R_1//R_2 + R_3)C_1S + 1 \ \delta \quad 7.$$

where $R_1//R_2$ is the parallel resistance value of $R_1$ and $R_2$. If $R_1 + R_2 = R_\delta$, the equation (4) holds in connection with the rudder angle ratio $K_P$, so that the equation (7) is rewritten into the following equation (8) or (9):

$$I_\delta(S) = (k k_\theta / R_\theta)\, 1/K_P \{(R_1 + R_3)C_1S + 1/(R_1//R_2 + R_3)C_1S + 1\}\delta \tag{8}$$

$$= (k k_\theta / R_\theta)\, 1/K_P \{1 + (R_1 - R_1//R_2)C_1S/(R_1//R_2 + R_3)C_1S + 1\}\delta \tag{9}$$

The equation (9) corresponds to equation (6) which is the equation for the conventional servo apparatus, so that the equation (9) will be described. A decrease in the set resistance value $R_2$ of the variable resistor $R_2$ causes a decrease in $R_\delta$, resulting in a decrease in the rudder angle ratio $K_P$. At this time, the gain constant of the feedback current I , in other words, the gain constant of the servo loop increases inversely proportional to the rudder angle ratio $K_P$. However, the derivative time $(R_1 - R_1//R_2)C_1$ of the hunting preventive circuit increases and, at the same time, the filter time constant $(R_1//R_2 + R_3)C_1$ decreases to provide for enhanced stabilizing effect of the hunting preventive circuit, so that even if the gain constant of the servo loop is large, stability is sufficiently maintained. Further, where $R_\delta$ is made large by selecting the resistance value $R_2$ large to increase the rudder angle ratio $K_P$, the gain constant of the servo loop becomes small. At this time, the derivative time $(R_1 - R_1//R_2)C_1$ of the hunting preventive circuit becomes short and the filter time constant $(R_1//R_2 + R_3)C_1$ becomes large to lessen the stabilizing effect of the hunting preventive circuit, so that even if the gain constant of the servo loop is small, stability does not become excessive. Therefore, there is no possibility of introducing the defect of the conventional apparatus wherein an increzse in the number of operations of the relay-like operation device leads to shortening of the lifetime of the relay-like operation device and the power unit as described previously in connection with FIG. 1. In the present invention, adjustment of the rudder angle ratio $K_P$ is performed by $R_\delta$ in the feedback circuit of the servo apparatus, so that the sensitivity of the servo apparatus of this invention in terms of the input deviation $\theta_e$ is not adversely affected by the rudder angle ratio $K_P$.

As described above, in the servo apparatus of this invention shown in FIG. 2, where the rudder angle ratio $K_P$ is small, the servo loop can be held sufficiently stable, so that hunting is prevented. Where the rudder angle ratio $K_P$ is large, stability of the servo loop does not become excessive but is held moderate and hence shortening of the lifetime of the relay-like operation device and the power unit does not occur. Accordingly, it is possible to obtain a mechanism for adjusting the rudder angle ratio over a wide range. Further, sensitivity of the servo apparatus of this invention in terms of the input deviation $\theta_e$ is held at a necessary value in practical use and it is not directly affected by the rudder angle ratio $K_P$.

Figure 3:
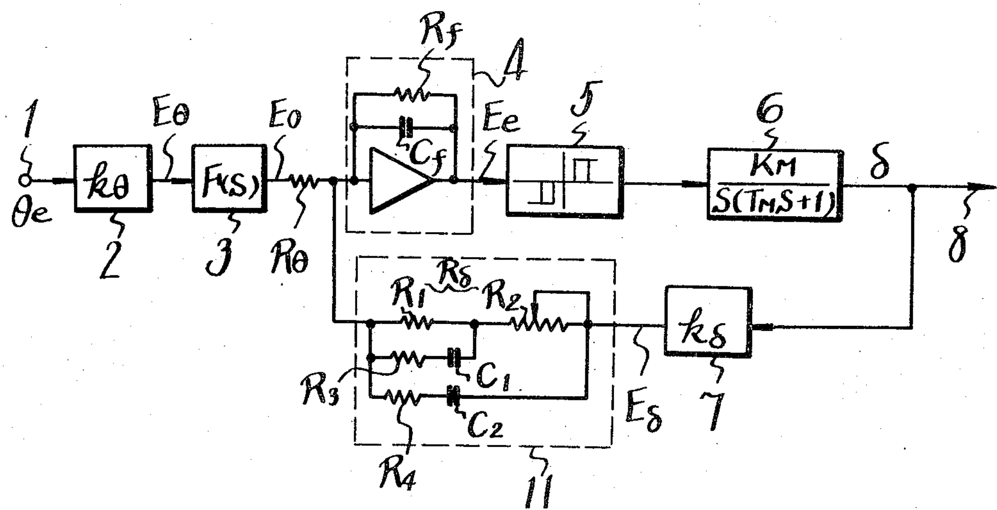
FIGS. 3 and 4 are schematic diagrams showing the circuits and constructions of other examples of the servo apparatus of this invention.

FIG. 3 illustrates a modified form of the servo apparatus for a marine autopilot according to this invention. In the figure, parts corresponding to those in FIG. 2 are marked with the same reference numerals. The example of FIG. 3 employs a circuit 11 as shown, in place of the feedback circuit 10 of the servo loop shown in FIG. 2. The circuit 11 is exactly identical in construction with circuit 10 in FIG. 2 except that a series circuit of a resistor $R_4$ and a capacitor $C_2$ is connected in parallel with the series circuit of the resistor $R_1$ and the variable resistor $R_2$ of the circuit 10 in FIG. 2. If the resistance value of the resistor $R_4$ is taken as $R_4$, the capacitance of the capacitor $C_2$ is taken as $C_2$ and the other values are held as described above with regard to FIG. 2, the feedback current $I_\delta(S)$ is given by the following equation (10) or (11):

$$I_\delta(S) = k_\delta\{/R_1+R_2\ (R_1+R_3)C_1S + 1/(R_1//R_2+R_3)C_1S + 1 + (R_1+R_2)C_2S/R_4C_2S + 1\}\delta \tag{10}$$

$$= k_\delta\{/R_1+R_2[\ (R_1+R_3)R_4+(R_1+R_2)(R_1//R_2+R_3)\}C_1C_2 S^2+\{(R_1+R_3)C_1+(R_1+R_2+R_4)C_2\}S+1 /(R_1//R_2+R_3)R_4C_1C_2S^2+\{(R_1//R_2+R_3)C_1 + R_4C_2\}\ S + 1]\delta \tag{11}$$

In practice, higher frequency factors are neglected and hence the equation (11) can be approximately expressed by the following equation (12) or (13):

$$I_\delta(S) \approx k_\delta\ /R_1+R_2\ \{(R_1+R_3)C_1 + (R_1+R_2+R_4)C_2\}S +1/\{(R_1//R_2+R_3)C_1 + R_4C_2\}S + 1\ \delta \tag{12}$$

$$= k_\delta\ /R_1+R_2\ [1 + \{(R_1-R_1//R_2)C_1+(R_1+R_2)C_2\}S/\{(R_1//R_2+R_3)C_1 + R_4C_2\}\ S + 1]\ \delta \tag{13}$$

Here, if $R_1+R_2=R_\delta$, the equation (4) hold with regard to the rudder angle ratio $K_P$, so that the equation (13) can be expressed in the following form:

$$I_\delta(S) = (k k_\theta / R_\theta)1/K_P\ [1 + \{(R_1-R_1//R_2)C_1 +(R_1+R_2)C_2\}S/\{(R_1//R_2+R_3)C_1 +R_4C_2\}\ S + 1\ ]\ \delta \tag{14}$$

A comparison of the equation (14) representing the feedback current in the example of FIG. 3 with the equation (9) representing the feedback current in the example of FIG. 2 shows that the derivative time of the numerator of the second term of the right side of the equation (14) is added with the term $(R_1+R_2)C_2 = R_\delta C_2$ due to the presence of the capacitor $C_2$ and that the filter time constant of the denominator of the second term is added with the term $R_4C_2$. In the example of FIG. 3, however, the term produced by the presence of the capacitor $C_1$ is primary, of course. With these additional terms, it is possible to design more appropriately the tendency of the change in the derivative time and the filter time constant with that in the resistance value $R_2$. Since the circuit constant of the hunting preventive circuit can be selected freely, it is possible to obtain servo apparatus which is sufficiently stable and highly reliable in operation with respect to the rudder angle adjustment value over a wide range.

Figure 4:
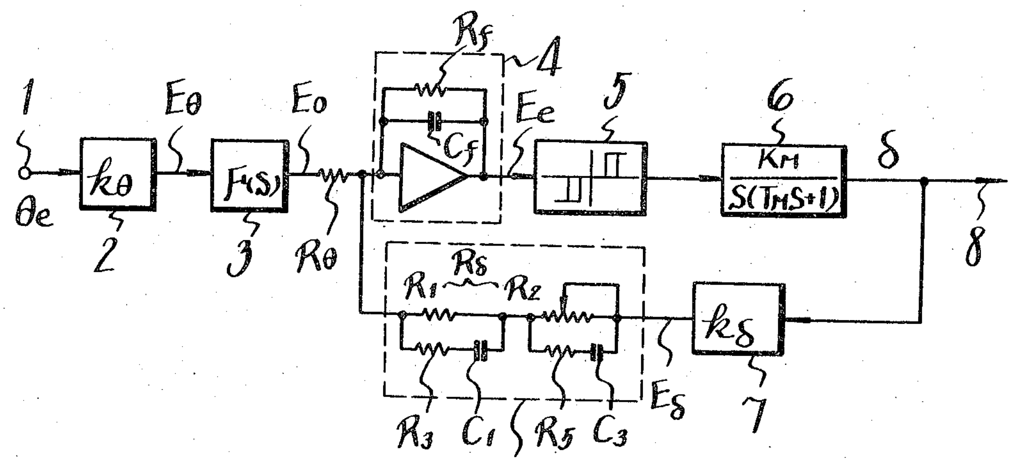

FIG. 4 shows still another modification of the servo apparatus of this invention, in which parts corresponding to those in FIG. 2 are identified by the same reference numerals. The illustrated example employs a circuit 12 in place of the feedback circuit 10 of the servo loop in FIG. 2. The circuit 12 is exactly identical in construction with circuit 10 in FIG. 2. except that a series circuit of a resistor $R_5$ and a capacitor $C_3$ is connected in parallel with the variable resistor $R_2$ of the circuit 10 in FIG. 2. If the resistance value of the resistor $R_5$ is taken as $R_5$, the capacitance of the capacitor $C_3$ is taken as $C_3$ and the other values are held similar to those described above with regard to FIG. 2, the feedback current $I_\delta(S)$ in the example of FIG. 4 is given by the following equation (15):

$$I_\delta(S)=k_\delta / R_1+R_2[(R_1+R_3)(R_2+R_5)C_1 C_3S^2+\{(R_1+R_3)C_1+(R_2+R_5)C_3\}S + 1/\{(R_1//R_2)(R_3+R_5)+R_3R_5\}C_1C_3S^2+\{(R_1//R_2+R_3)C_1+(R_1//R_2+R_5)C_3\}S+1]\delta \qquad 15.$$

Since higher frequency terms can be neglected in practical use, the equation (15) can be approximately expressed by the following equation (16). Here, if $R_1+R_2=R_\delta$ and the equation (4) concerning the rudder angle ratio $K_P$ is used, the equation (15) can be expressed in the following form:

$$I_\delta(S)=(k\,k_\theta / R_\theta)1/K_P[1+\{(R_1-R_1//R_2)C_1+(R_2-R_1//R_2)C_3\}S/\{(R_1//R_2+R_3)C_1+(R_1//R_2+R_5)C_3\}S+1]\delta \qquad 16.$$

A comparison of the equations (16) and (9) representing the feedback currents in the examples of FIGS. 4 and 2 reveals that the derivative time of the numerator of the second term of the right side of the equation (16) is added with the term $(R_2-R_1//R_2)C_3$ and the filter time constant of the denominator of the second term is added with the term $(R_1//R_2=R_5)C_3$ due to the presence of the capacitor $C_3$. Accordingly, it is possible to design adequately to compensate the tendency of the change in the derivative and the filter time constant with the resistance value $R_2$. Of course, also in the example of FIG. 4, main components of the derivative time and the filter time constant are those produced by the presence of the capacitor $C_1$.

As described above, in the example of FIG. 4, the circuit constant of the hunting preventive circuit can be freely selected as is the case with the example of FIG. 3 and it is possible to obtain servo apparatus which is sufficiently stable and highly reliable in operation with respect to the rudder angle adjustment value over a wide range.

As has been described in the foregoing, with the servo apparatus for use in a marine autopilot according to this invention, the time constant of the hunting preventive circuit automatically varies in association with the rudder angle adjustment mechanism without requiring any special interlocking mechanism and, where the rudder angle ratio $K_P$ is small, stability of the servo loop is sufficiently ensured to prevent hunting and also where the rudder angle ratio $K_P$ is large, appropriate stability is maintained to prevent shortening of the lifetime of the relay-like operation device and the power unit. Therefore, a rudder angle adjusting mechanism can be obtained over a wide range.

Further, the input sensitivity of the servo apparatus of this invention is not affected by the rudder angle ratio $K_P$, so that accuracy of the servo apparatus is maintained at a value which is necessary for practical use.

It will be apparent that many modifications and variations may be effected without departing from the spirit and scope of the novel concepts of this invention. Accordingly, the scope of this invention should be determined by the appended claims only.

We claim as our invention:

1. A servo apparatus for a marine autopilot comprising a servo loop consisting of a servo-amplifier, a relay-like operation device, a power unit, a transducer and a feedback circuit including a first resistor and a series circuit of a second resistor and a first capacitor connected in parallel to said first resistor for stabilization, and a third variable resistor connected in series with the parallel circuit of the first resistor and the series circuit whereby stabilizing effects on said servo loop by said series circuit is varied by changing the resistance value of said third variable resistor.

2. A servo apparatus for a marine autopilot according to claim 1 in which said feedback circuit further includes a second series circuit of a fourth resistor and a second capacitor.

3. A servo apparatus for a marine autopilot according to claim 2 in which said second series circuit is connected in parallel to the series circuit of the first resistor and the third variable resistor.

4. A servo apparatus for a marine autopilot according to claim 1 in which a third series circuit of a fifth resistor and a third capacitor are connected in parallel to said third variable resistor.

* * * * *